United States Patent [19]

Edakubo et al.

[11] Patent Number: 4,899,236
[45] Date of Patent: Feb. 6, 1990

[54] RECORDING OR REPRODUCING APPARATUS USING CONTAINER MOUNTED STRIP-LIKE RECORDING MEDIUM

[75] Inventors: Hiroo Edakubo, Tokyo; Takashi Itani; Takashi Narasawa, both of Kanagawa; Tatsuzo Ushiro, Tokyo; Hiroshi Watanabe, Tokyo; Masahide Hasegawa, Tokyo, all of Japan

[73] Assignee: Canon Kabushiki Kaisha, Japan

[21] Appl. No.: 145,657

[22] Filed: Jan. 13, 1988

Related U.S. Application Data

[63] Continuation of Ser. No. 861,108, May 6, 1986, abandoned, which is a continuation of Ser. No. 437,470, Oct. 28, 1982, abandoned.

[30] Foreign Application Priority Data

Nov. 5, 1981 [JP] Japan ................................ 56-177450
Nov. 5, 1981 [JP] Japan ................................ 56-177449

[51] Int. Cl.⁴ ........................................... G11B 15/665
[52] U.S. Cl. ......................................... 360/95; 360/85
[58] Field of Search ................... 360/74.1, 74.5, 74.6, 360/83-85, 93, 95, 132, 72.1; 242/188, 195

[56] References Cited

U.S. PATENT DOCUMENTS 4,365,277 12/1982 Namiki ............................... 360/72.1

FOREIGN PATENT DOCUMENTS 0020674 9/1969 Japan .................................... 360/85
0052546 4/1980 Japan ................................... 360/74.6

Primary Examiner—A. J. Heinz
Assistant Examiner—David J. Severn
Attorney, Agent, or Firm—Toren, McGeady & Associates

[57] ABSTRACT

Moving elements in a recording and/or reproduction apparatus change the travel path of a strip-like recording medium mounted in a container. A detector detects a specified part of parts of the medium having a character different from other parts of the medium and at least part of a light emitting and/or light receiving arrangement of the detector moves into and out of the space required for altering the path of the medium.

10 Claims, 5 Drawing Sheets

F I G. 10
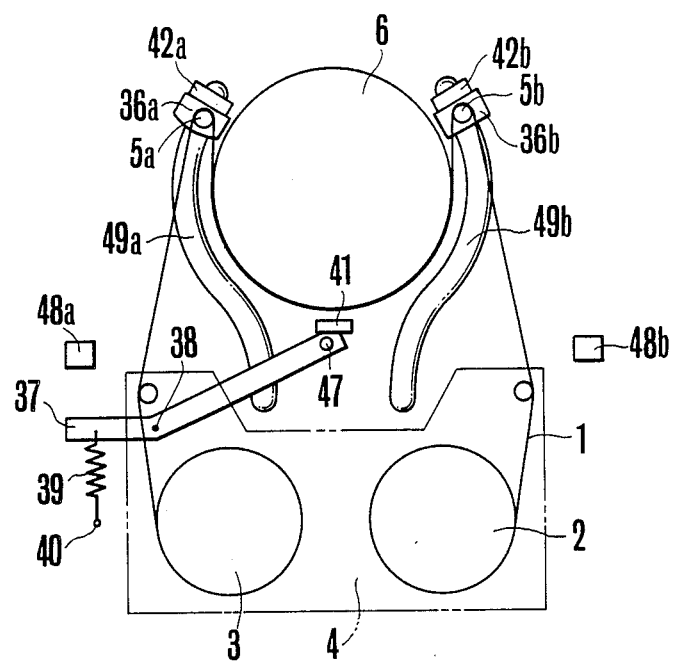
F I G. 13
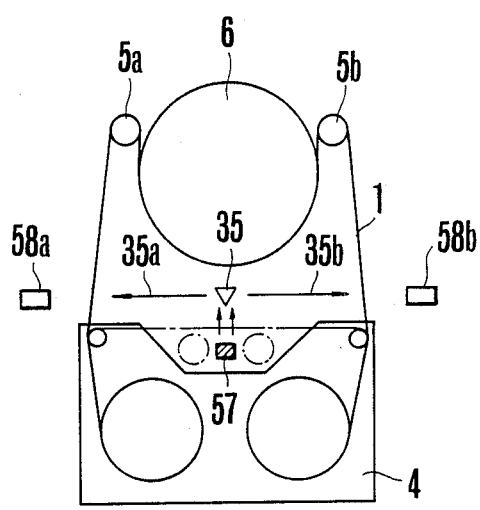

RECORDING OR REPRODUCING APPARATUS USING CONTAINER MOUNTED STRIP-LIKE RECORDING MEDIUM

This is a continuation of application Ser. No. 861,108, filed May 6, 1986, which in turn is a continuation application of Ser. No. 437,470, filed Oct. 28, 1982.

BACKGROUND OF THE INVENTION

1. Field of the Invention

This invention relates to an information recording or reproducing apparatus and more particularly to an information recording or reproducing apparatus which is capable of detecting the travelling status of a recording medium in use.

2. Description of the Prior Art

In this specification, a magnetic tape will be used as an example of the recording medium while a video tape recorder (hereinafter will be called VTR's) adapted for recording or reproducing video signals will be used as an example of apparatuses to which the present invention is applicable. VTR's of the type that use a non-endless magnetic tape are arranged such that, when the magnetic tape is completely wound on one of reels, the reels cease to rotate. In that instance, a reel driving arrangement must be disengaged from the base of the reel, otherwise a belt idler and the like will begin to slip. The slippage then tends to cause rubber components or the like to deform by abrasion, and so forth.

To prevent this, it is necessary to provide the VTR with some end stop means for stopping the apparatus when the tape is wound up on one of the reels. Heretofore, a method for stopping the rotation of a reel hub has been employed for this purpose. This conventional method, however, requires some length of time to elapse before the apparatus stops after the tape has come to an end. During this length of time, the above stated deformation and other difficulties still occur. Besides, where both ends of the tape are provided with leader tapes, the leader tape contacts a rotating magnetic head and jams the surface of the head.

To solve this problem, in another conventional method, a transparent leader tape is used as an optionally detectable element. In that method, however, the optical detecting means includes a light emitting (or receiving) member that is inserted in the tape cassette and a light receiving (or emitting) member that is disposed opposite to the light emitting (or receiving) member across the tape. The two leader tape detecting members must be arranged in respective positions in which the tape is interposed in between them not only in a tape loading condition but also in a condition in which the tape is placed within the cassette. In the case of a magnetic tape device using a small cassette, this requirement has resulted in a complex structural arrangement for both the cassette and the device. This structural complexity has hindered efforts to attain reduction in size as well as construction simplification for the apparatus.

SUMMARY OF THE INVENTION

These and other problems that have beset the prior art are overcome, to a great extent through an apparatus that shifts the illustrative end-of-tape optical detection apparatus, or portions of that apparatus, out of the way of the tape and back into the correct orientation relative to the tape as the tape is drawn into recording, reproducing, feeding and rewinding conditions. In this way the need for complicated and bulky mechanisms that have characterized the prior art is avoided.

It is therefore a general object of the present invention to provide an information recording or reproducing apparatus which is capable of detecting the travelling status of the recording medium through a simple structural arrangement within and a small volume to eliminate the shortcomings of the prior art mentioned above.

The above and further objects and features of the invention will become apparent from the following detailed description of embodiments thereof taken in conjunction with the accompanying drawings.

BRIEF DESCRIPTION OF THE DRAWINGS

FIGS. 8, 9 and 10 are illustrations showing a light emitter as an embodiment of the invention with a loading mechanism used as moving means;

FIG. 13 is a plan view showing detecting means as a further embodiment of the invention.

DETAILED DESCRIPTION OF THE PREFERRED EMBODIMENTS

Figure 1:
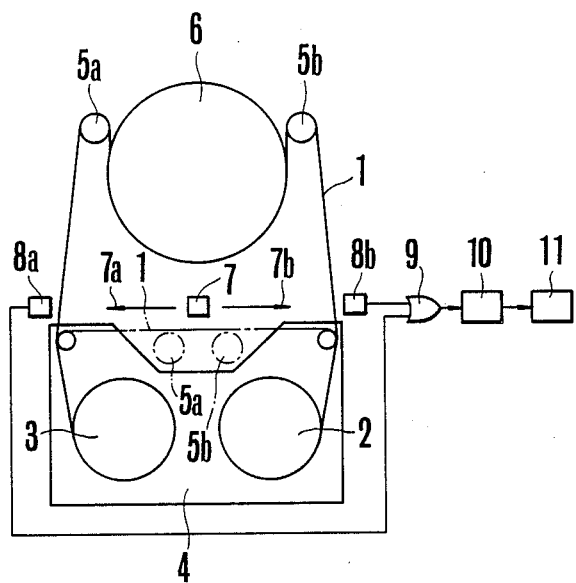
Fig. 1 is a plan view showing a VTR according to the invention in a recording or reproducing condition.
Figure 2:
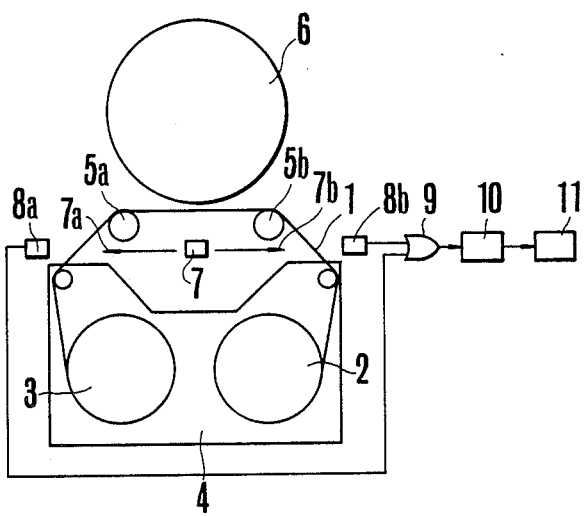
FIG. 2 is a plan view of the VTR shown in FIG. 1 in a quick feeding or rewinding condition.
Figure 3:
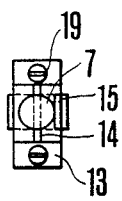
FIG. 3 is a plan view showing an example of a light emitting device including a light emitting part.
Figure 4:
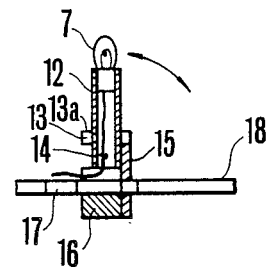
FIG. 4 is a front view of the light emitting device shown in FIG. 3.
Figure 5:
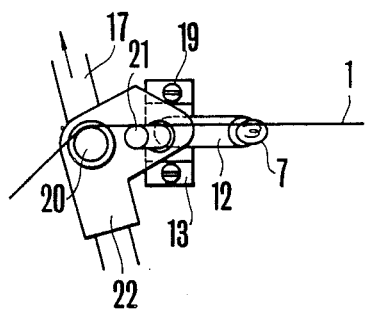
FIG. 5 is a plan view showing the light emitting device of FIG. 3 in a tilting state.
Figure 6:
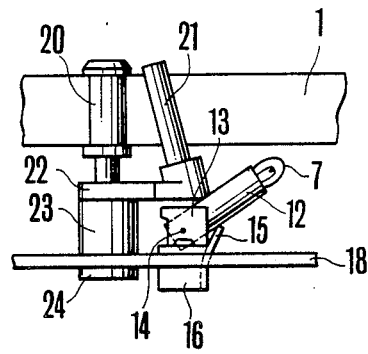
FIG. 6 is a front view of the light emitting device of FIG. 3 in the tilting state.

An embodiment of the present invention wherein the invention is applied to detection of the end of a tape in a VTR is as shown in FIGS. 1 and 2. The VTR is shown in FIG. 1 in a recording or reproducing condition and in FIG. 2 in a quick feeding or rewinding condition. Referring to these drawings, a magnetic tape 1 has an opaque magnetic part for recording or reproducing information and leader tape parts at both ends of the tape for permitting end of tape detection. The VTR comprises a take-up reel 2; a feed reel 3; a cassette 4 arranged to contain the tape 1; extraction guides 5a and 5b for pulling the tape 1 out of the cassette 4; and a rotary cylinder 6 having a rotary magnetic head. A light emitting part 7 for for detecting the end of the tape 1 also is shown with light receiving parts 8a and 8b for tape end detection. An OR circuit 9, which is arranged to produce an output upon receipt of a light input is coupled to an amplifier circuit 10 which amplifies the output of the OR circuit 9 to activate an automatic stop mechanism 11 which is arranged in a known manner to activate a solenoid, or the like, upon receipt of the output from the amplifier circuit 10 to bring about a stop mode for safely stopping the VTR.

In FIG. 1, one-dot broken lines indicate the condition of the tape 1 immediately after the cassette is inserted in the VTR (or a condition called and unloading condition). In this condition, the light emitting and receiving elements 7, 8a and 8b for end detection are on the same side of the tape 1. When a recording or reproducing switch (not shown in FIGS. 1 and 2) is turned on, the tape 1 is pulled out by the extraction guides 5a and 5b and is drawn against the rotary cylinder 6 to subtend an angle of more than 180 degrees. During this loading process, the light emitting part 7 moves to the lower side of the tape 1 in response to a loading mechanism which is not shown in FIGS. 1 and 2.

The tape 1 passes the upper side of the light emitting part 7 and comes to a position where the light receiving parts 8a and 8b confront each other across the tape 1. With the tape set emitting part 7 is blocked by the magnetic part of the tape 1 (other than its leaders or end parts) and does not reach the light receiving parts 8a and 8b. In that condition, therefore, the OR circuit 9 produces no output and the automatic stop mechanism 11 remains inoperative.

When the tape 1 is taken up by the take-up reel 2 during a recording, ordinary reproducing or quick feeding reproducing process, one of the transparent leader tape parts is unreeled from the feed reel 3. When this leader part passes an optical path indicated by an arrow 7a in FIG. 1, the light emitted by the light emitting part 7 reaches the light receiving part 8a. This incident light causes the OR circuit 9 to produce an output signal. The output signal, in turn, activates the automatic stop mechanism 11 and brings the apparatus to a complete stop before the transparent leader tape reaches the rotary cylinder 6.

In the case of reproduction which is accomplished by rewinding the tape 1, the tape 1 is rewound on the feed reel 3. Then, another transparent leader tape is unreeled from the tape-up reel 2 to pass the optical path. This allows the light to reach the light receiving part 8b. The OR circuit 9 then produces an output signal that activates the automatic stop mechanism 11.

FIG. 2 is a plan view schematically showing the quick feeding or rewinding condition of the VTR for the same tape cassette embodiment. In the Figures, like parts are referred to by like reference characters. When the cassette 4 is inserted in the body of the VTR, a mounting completion switch is automatically turned on and the tape loading process begins. The extraction guides 5a and 5b, respectively, come to positions where the tape 1 is abreast of the light receiving parts 8a and 8b and in which the tape does not block the optical path when the tape 1 is not in contact with the rotary cylinder 6. Then, the loading process comes to an end and the VTR remains in this condition until a command is issued (hereinafter this will be called a pre-loading condition).

When a switch for commanding the VTR to perform recording or reproduction is turned on during this pre-loading condition, the extraction guides 5a and 5b further proceed with their loading action to bring about the condition as shown in FIG. 1. Further, when a switch for commanding the VTR to perform either quick feeding or rewinding is turned on, the process of quick feeding or rewinding is carried out under the condition shown in FIG. 2.

During the quick feeding process, the tape 1 is taken up on the take-up reel 2 and, when the transparent leader tape part unreels from the feed reel 3, the light emitted from the light emitting part reaches the light receiving part 8b. This causes the OR circuit 9 to produce an output signal. The output signal in turn causes the automatic stop mechanism 11 to operate. During the rewinding process on the other hand, the transparent leader tape part unreels from the take-up reel 2 to allow the light to reach the other light receiving part 8a and the automatic stop mechanism deactivates the apparatus and causes it to stop.

Another embodiment in which a light emitting device including, a light emitting part 7 is arranged as shown in FIGS. 3, 4, 5 and 6.

The embodiment comprises a tube 12 to which the light emitting part 7 is secured; a support base 13 for supporting and positioning the tube 12; and a shaft 14 which rotatably carries the tube 12 and is secured to the support base 13. A spring 15, which restricts the rotation of the tube 12 is attached to a spring fixing base 16 for securing the spring 15; a guide groove 17 for pulling the tape 1 out; a base plate 18; and screws 19 for fixing the support base 13 to the base plate 18. A vertical post 20 is provided for guiding the travel of the tape 1; a tilting post 21; a tilting post fixing base 22 for securing the tilting post 21; an upper guide 23 which is provided for moving the tilting post fixing base 22 along the guide groove 17; and a lower guide 24.

The light emitting part 7 is secured to the tube 12 and is arranged for detecting the end of the tape 1. The tube 12 is rotatably carried by the shaft 14 which is secured to the support base 13. The support base 13, however, is provided with a positioning face 13a that defines the position of the tube 12. The tube 12 is urged by the spring 15 and is normally fixed in After commencement of loading, when the vertical post 20 and the tilting post 21 move along the guide groove 17, a part of the tilting post fixing base 22 comes into contact with the tube 12. This contacting part of the tilting post fixing base 22 is a cam face that applies a force to rotate the tube 12. Therefore, the tube 12 turns on the shaft 14 to tilt according to the motion of the tilting post fixing base 22. This arrangement causes the light emitting part 7, which is normally in a position to prevent the path of the tape 1 from being changed, to move to the lower side of the tape 1. Further movement of the tilting post fixing base 22 enables the tube 12 to swing back into an upright posture by virtue of the urging force of the spring 15. Then, the light receiving parts 8a and 8b (FIG. 1) are opposed to each other with the tape interposed in between them. The path of the tape 1 is altered through the relationship between the loading mechanism and the light emitting part 7.

In the specific embodiment of the invention which has been described in the foregoing, the relative positions of the light emitting part 7 and the light receiving parts 8a and 8b are interchangeable. Further, at the pre-loading stage, the tape 1 may be allowed to come into contact with the rotary cylinder 6 to a slight degree. It is also possible to omit the pre-loading process by arranging the automatic stop mechanism to respond suitably for quick feeding or rewinding when the rotation of the reel base comes to a stop.

Figure 7:
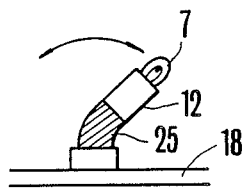
FIG. 7 is a front view showing another example of the light emitting device.

FIG. 7 shows the structural arrangement of a light emitting device as another embodiment of the invention. Referring to FIG. 7, in this case a part 25 indicated by hatching is made of an elastic material, such as rubber or a spring material. The light emitting device is ordinarily perpendicular to the base plate to which it is secured. When the loading process begins, a part of the tilting post fixing base 22 shown in FIG. 6 applies a force to the hatched part 25 to tilt the light emitting device.

Figure 8:
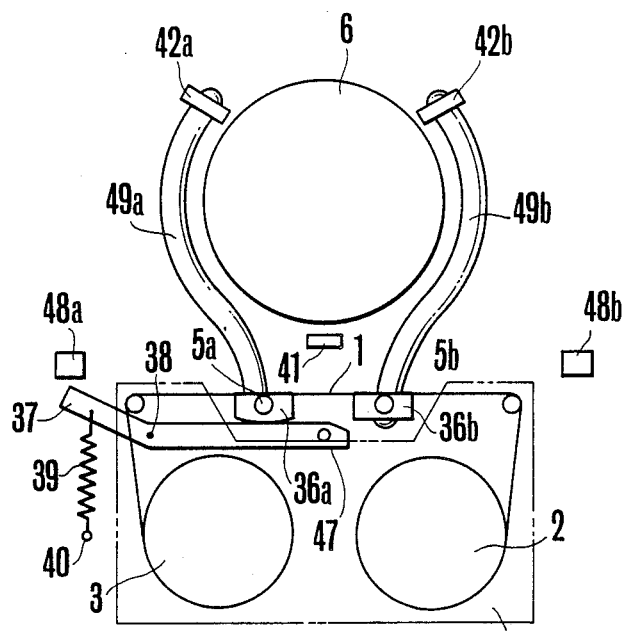
Figure 9:
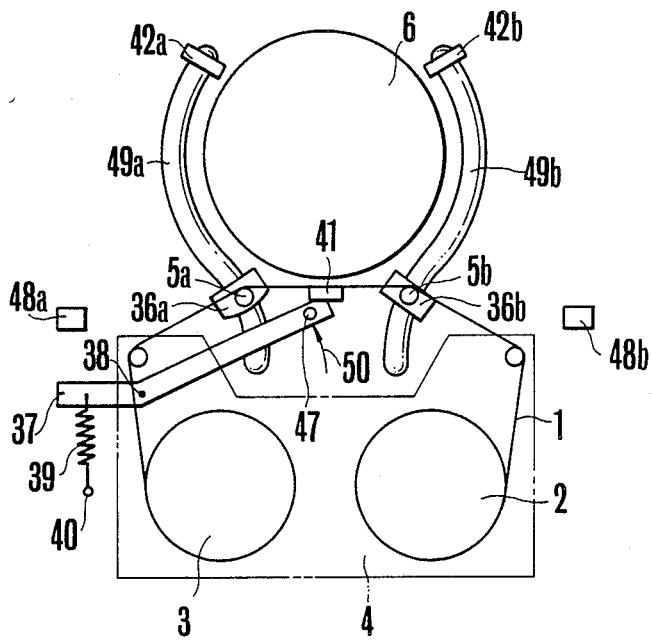

A further embodiment of the invention relative to the arrangement that correlates the light emitting part to the loading mechanism which serves as the tape moving means in a VTR is as shown in FIGS. 8-10. FIG. 8 shows the embodiment in an unloading condition. The parts which are identical with those shown in FIG. 1 are indicated by the same reference numerals. The embodiment includes a light emitting part 47; light receiving parts 48a and 48b; guide grooves 49a and 49b; support bases 36a and 36b for the extraction guides 5a and 5b. Also shown is an arm 37 for carrying the light emitting part 7; an arm post 38 which rotatably carries the arm 37; a spring 39 urging the arm 37 to move toward the support base 36a; a spring peg 40 which secures the spring 39 to a chassis which is not shown; an arm stopper 41; and guide catchers 42a and 42b. The guides 5a and 5b and the light emitting part 47 are disposed within an opening area of the cassette 4. The arm 37 is urged to rotate on the arm post 38 toward the support base 36a by the spring 39. However, this rotation of the arm 37 is restricted by the abutting engagement of the arm 37 with the support 36a.

The quick feeding or rewinding conditions of this embodiment are shown in FIG. 9. At the time of quick feeding or rewinding, the tape 1 is brought into a preloading condition as described in the foregoing with respect to FIG. 8. In this case, the guides 5a and 5b move along the guide grooves 49a and 49b. As a result, the arm 37 which is being urged by the spring 39 moves in the direction of arrow 50. The arm 37 then is stopped by abutting the arm stopper 41. However, the guides 5a and 5b move further until they come to a stop in their positions where they confront the light receiving parts 48a and 48b across the page 1 and where they are not blocking the optical path and are not bringing the tape into contact with the rotary cylinder 6. This condition persists until a next command is issued.

There are various known methods for causing the guides 5a and 5b to move along the guide grooves 49a and 49b. The known methods include a method of using a loading ring; a method of using a link arrangement; a method of using a wire; and so on.

The recording or reproducing condition of the embodiment is shown in FIG. 10. In the condition as shown in FIG. 9, when a recording or reproducing command is produced, the loading process further proceeds. The loading process is completed when the support bases 36a and 36b abut the guide catchers 42a and 42b. The light emitting part 47 is then set jointly by the spring 39 and the arm stopper 41 in a position that is abreast the light receiving parts 48a and 48b. In taking the cassette out of the VTR, the guides 5a and 5b are unloaded and, during the unloading process, the support base 36a bears against the arm 37 to push the arm 37 and to allow the guides 5a and 5b to be placed back in the opening part of the cassette.

Figure 11:
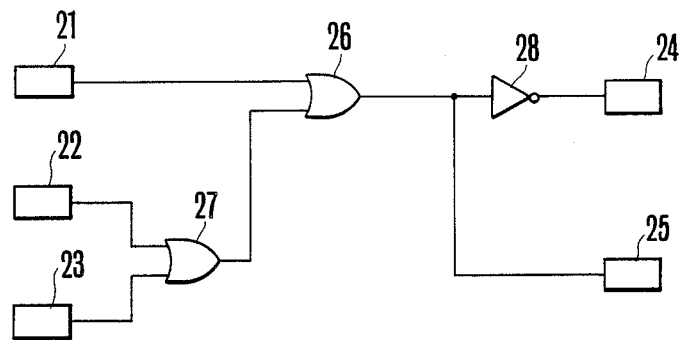
FIGS. 11 and 12 are illustrations showing means for correlating the light emitting part to a loading mechanism.
Figure 12:
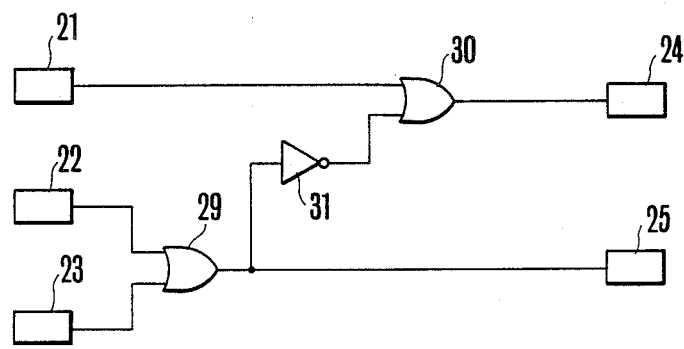

FIGS. 11 and 12 are block diagrams of other embodiments showing arrangement for correlating the movement of the light emitting part with the loading mechanism. These embodiments include an unloading detector 21 which is arranged to detect an unloading condition and to produce an output signal at the time of unloading; a pre-loading detector 22 which likewise produces an output signal at the time of the pre-loading; and a loading completion detector 23 which produces an output signal upon completion of loading. Also shown are OR circuits 26, 27 (FIG. 11) and 29 and 30 (FIG. 12). Also illustrated are "not" circuits 28 (FIG. 11) and 31 (FIG. 12), a first moving device 24 for moving the light emitting part to a position where it does not block the travelling path of the tape 1; and a second moving device 25 for moving the light emitting part to a position where it confronts the light receiving parts across the tape 1. In the case of FIG. 11, the second moving device 25 is energized to move the light emitting part 7 (not shown in FIG. 11) to a position abreast of the light receiving parts 8a and 8b across the tape 1 when any of the unloading detector 21, the pre-loading detector 22 and the loading completion detector 23 produces an output signal. With the exception of these occasions, the first moving device 24 is energized to move the light emitting part 7 to a position that does not hinder the tape loading process.

In the embodiment shown in FIG. 12, the second moving device 25 is actuated when an output signal is produced from the pre-loading detector 22 or the loading detector 23 and, at times other than that, the first moving device is actuated.

A further embodiment is arranged as shown in FIG. 13. In this case, the light emitting part 57 is disposed within the opening part (not shown) of the cassette 4 with a reflecting element 35 arranged opposite to the light emitting part 57. Under an unloading condition, the reflection element is on the same side of the tape 1 as the light emitting part and splits the light emitted from the light emitting device into two directions. The light is thus guided by the reflection element 35 to the light receiving parts 58a and 58b as indicated by arrows 35a and 35b. Further, the reflection element 35 is interlocked with the tape loading mechanism to be retracted away from the tape path only during a tape loading process.

In the embodiments shown in FIGS. 1, 2 and 8, the apparatus is arranged to detect the ends of the recording medium. However, in accordance with the invention, the part to be detected can be positioned at any desired location along the length of the tape.

Further, the invention is not limited to an apparatus for activating the automatic stop mechanism after detection. The stop arrangement may be replaced with some other arrangement, as for example, to effect a switch-over from one operating mode to another.

The apparatus according to the invention has the detecting means correlated with the movement of the strip-like recording medium in such a manner that, unlike the conventional apparatuses, it eliminates the need for the additional mechanisms described in the prior art summary. Besides, on the side of the body of the apparatus, the position in which detecting means is to be disposed is not limited and, unlike the conventional, apparatuses, thus does not require any extra volume. Further, with the path of the strip-like medium arranged to be in a position to permit operation of the detecting means even under conditions other than recording and reproducing, the parts to be detected thus can be detected under conditions other than recording or reproducing.

The invention thus effectively contributes to reduction in apparatus size and simplification.

What is claimed is:

1. A recording and/or reproducing apparatus using a strip-like recording medium in a container, the apparatus comprising:
    (a) recording and/or reproducing means for recording and/or reproducing a signal on and or from the recording medium;
    (b) loading means for taking out the strip-like recording medium from the container for recording and- /or reproducing by said recording and/or reproducing means;

(c) light emitting and/or light receiving means for detecting a specified part of the strip-like recording medium, the specified part having a characteristic different from other parts of the medium;

(d) supporting means for supporting at least a part of said light emitting and/or light receiving means so that it is shiftable between a first position outside a space through which the medium is passed by the taking out operation of said loading means and a second position located within said space; and (e) positioning means for positioning said part of the light emitting and/or light receiving means at said first position during a term when said medium is passing said second position by the taking out operation of said loading means and for positioning said part of the light emitting and/or light receiving means at said second position after said medium has passed said second position.

2. An apparatus according to claim 1, further comprising:

control means for controlling the medium taking out operation of said loading means in accordance with detection results of said light emitting and/or light receiving means.

3. An apparatus according to claim 1, further comprising:

control means for controlling the recording and/or reproducing action of said recording and/or reproducing means in accordance with detection results of said light emitting and/or light receiving means.

4. An apparatus according to claim 1, wherein said positioning means is arranged to position said part of said light emitting and/or light receiving means at said second position when said medium does not exist at said second position and to position said part of said light emitting and/or light receiving means at said first position when said medium exists at said second position.

5. An apparatus according to claim 1, wherein the specified part of the medium is transparent, the other parts of the medium are opaque, and said light emitting and/or light receiving means includes a light emitting member and a light receiving member for receiving a light emitted by said light emitting member.

6. An apparatus according to claim 5, wherein said supporting means is arranged to support said light emitting member so that it is shiftable between said first position and said second position.

7. An apparatus according to claim 5, wherein said light emitting and/or light receiving means further includes a reflection member for enabling said light receiving member to receive the light emitted from said light emitting member.

8. An apparatus according to claim 7, wherein said supporting means is arranged to support said reflection member so that it is shiftable between said first position and said second position.

9. A recording and/or reproducing apparatus using a strip-like recording medium in a container, the apparatus comprising:

(a) recording and/or reproducing means for recording and/or reproducing a signal on and/or from the recording medium;

(b) loading means for taking out the strip-like recording medium from the container for recording and/or reproducing by said recording and/or reproducing means;

(c) light emitting and/or light receiving means for detecting specified parts of the strip-like recording medium, the specified parts having a different characteristic from other parts of the medium, said light emitting and/or light receiving means having a first member and a second member to make a pair for detecting the specified parts;

(d) supporting means for supporting said first member so that it is shiftable between a first position located outside a space through which the medium is passed by the taking out operation of the loading means and a second position located within said space; and (e) positioning means for positioning said first member at said first position during a term when said medium is passing said second position by the taking out operation of said loading means and for positioning said first member at said second position after said medium has passed said second position.

10. An apparatus according to claim 9, wherein said specified part of the medium is transparent, the other parts of the medium are opaque, and the first member includes a light emitting member.

* * * * *